(12) United States Patent
Ogihara et al.

(10) Patent No.: US 12,064,920 B2
(45) Date of Patent: Aug. 20, 2024

(54) MATERIAL FEEDING DEVICE, THREE-DIMENSIONAL SHAPING DEVICE, AND INJECTION MOLDING DEVICE

(71) Applicant: SEIKO EPSON CORPORATION, Tokyo (JP)

(72) Inventors: Masaaki Ogihara, Matsumoto (JP); Taki Hashimoto, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/079,055

(22) Filed: Dec. 12, 2022

(65) Prior Publication Data

US 2023/0182393 A1 Jun. 15, 2023

(30) Foreign Application Priority Data

Dec. 13, 2021 (JP) ................................ 2021-201476

(51) Int. Cl.
*B29C 64/321* (2017.01)
*B29C 45/18* (2006.01)
(Continued)

(52) U.S. Cl.
CPC ............ *B29C 64/321* (2017.08); *B29C 45/18* (2013.01); *B29C 45/464* (2013.01); *B29C 45/77* (2013.01); *B29C 45/78* (2013.01); *B29C 64/209* (2017.08); *B29C 64/386* (2017.08); *B29C 64/393* (2017.08); *B33Y 30/00* (2014.12); *B33Y 50/02* (2014.12); *B29C 2945/7604* (2013.01);
(Continued)

(58) Field of Classification Search
CPC ... B29C 64/209; B29C 45/464; B29C 64/118; B29C 64/314; B29C 64/343; B29C 45/586; B29C 45/588; B29C 2945/76083; B29C 2945/7618; B29C 2945/762; B29C 2945/76207; B29C 45/76; B29C 45/80; B29C 45/1742; B29C 2945/7602
See application file for complete search history.

(56) References Cited

U.S. PATENT DOCUMENTS

| 3,709,636 A * | 1/1973 | Rosenberg | ............ A61M 5/172 |
| | | | 417/12 |
| 2017/0021542 A1* | 1/2017 | Lindberg | ................ B29C 45/76 |

(Continued)

FOREIGN PATENT DOCUMENTS

| JP | 2948620 B2 * | 9/1999 | ........... B29C 45/544 |
| JP | 2000127213 A * | 5/2000 | ......... B29C 45/1753 |

(Continued)

*Primary Examiner* — Seyed Masoud Malekzadeh
(74) *Attorney, Agent, or Firm* — Harness, Dickey & Pierce, P.L.C.

(57) ABSTRACT

A material feeding device includes a plasticizing unit configured to plasticize resin pellets to generate a plasticized material, a nozzle that has a nozzle opening and is configured to send out the plasticized material from the nozzle opening to the outside, a flow path that communicates with the nozzle opening and through which the plasticized material flows, a suction unit including a plunger configured to suction the plasticized material into a first cylinder coupled to the flow path, and a plunger motor configured to drive the plunger, and a detection unit configured to detect a position of the plunger in the first cylinder.

12 Claims, 11 Drawing Sheets

(51) Int. Cl.
  *B29C 45/46* (2006.01)
  *B29C 45/77* (2006.01)
  *B29C 45/78* (2006.01)
  *B29C 64/209* (2017.01)
  *B29C 64/386* (2017.01)
  *B29C 64/393* (2017.01)
  *B33Y 30/00* (2015.01)
  *B33Y 50/00* (2015.01)
  *B33Y 50/02* (2015.01)

(52) U.S. Cl.
  CPC ............ *B29C 2945/76056* (2013.01); *B29C 2945/76083* (2013.01); *B29C 2945/7618* (2013.01); *B33Y 50/00* (2014.12)

(56) References Cited

U.S. PATENT DOCUMENTS

| | | | |
|---|---|---|---|
| 2017/0282243 A1* | 10/2017 | Yokoyama | B22D 17/10 |
| 2018/0133943 A1* | 5/2018 | Aiba | B29C 45/7306 |
| 2019/0358903 A1* | 11/2019 | Watanabe | B22F 10/22 |
| 2020/0164589 A1* | 5/2020 | Yuwaki | B22F 12/53 |
| 2021/0114306 A1 | 4/2021 | Yamazaki | |
| 2021/0187809 A1* | 6/2021 | Akiyama | B29C 45/766 |
| 2021/0268703 A1* | 9/2021 | Aiba | B29C 45/80 |

FOREIGN PATENT DOCUMENTS

| | | | | |
|---|---|---|---|---|
| JP | 3869349 B2 * | 1/2007 | ......... | C03B 9/1938 |
| JP | 2021-062566 A | 4/2021 | | |
| JP | 6940665 B1 * | 9/2021 | ......... | B29C 45/461 |

\* cited by examiner

MATERIAL FEEDING DEVICE, THREE-DIMENSIONAL SHAPING DEVICE, AND INJECTION MOLDING DEVICE

The present application is based on, and claims priority from JP Application Serial Number 2021-201476, filed Dec. 13, 2021, the disclosure of which is hereby incorporated by reference herein in its entirety.

BACKGROUND

1. Technical Field

The present disclosure relates to a material feeding device, a three-dimensional shaping device, and an injection molding device.

2. Related Art

A material feeding device that feeds a plasticized material obtained by plasticizing a resin material is used in a three-dimensional shaping device of a thermal melting lamination type and an injection molding device. The resin material is also referred to as resin pellets. A resin material obtained by plasticizing resin pellets is referred to as a plasticized material or a shaping material.

The resin material is not limited to a thermoplastic resin only. The thermoplastic resin may be plasticized to have fluidity. The resin material may include a thermoplastic resin mixed with various materials such as metal, ceramic, and fiber. The resin pellets include pellets of a thermoplastic resin alone, and pellets of a thermoplastic resin mixed with various materials such as metal, ceramic, and fiber.

In a material feeding device disclosed in JP-A-2021-62566, a flat screw and a barrel are arranged in a manner of facing each other. The flat screw has a substantially disc shape, and includes a spiral groove formed on a surface orthogonal to a rotation axis based on an involute curve. The flat screw is rotated by a motor. The barrel includes a heater that melts resin pellets and a flow path through which a molten resin material passes. The resin pellets are melted and pressurized in the spiral groove. The melted and pressurized plasticized material is press-fitted into the flow path of the barrel. The plasticized material is sent to the outside from a nozzle opening through the flow path of the barrel.

The barrel of the material feeding device disclosed in JP-A-2021-62566 includes a cylinder. A plunger is inserted into the cylinder. The plunger is moved by a plunger drive unit. One end of the cylinder is coupled to the flow path through which the plasticized material passes. The cylinder and the plunger constitute a suction mechanism for suctioning the plasticized material. When feeding of the plasticized material is to be stopped, the plunger drive unit pulls the plunger to suction the plasticized material. The plunger prevents trailing caused by the plasticized material dripping in a manner of pulling a thread from the nozzle opening.

In the suction mechanism described in JP-A-2021-62566, a position where the plunger protrudes the most by being pushed by a pressure of the plasticized material in the flow path of the barrel is regarded as a position where the plunger is pulled the most. An origin of the plunger is set with reference to this position. Alternatively, when an operator pushes the plunger into the cylinder with a finger, the origin of the plunger is set with reference to a position where the plunger is pushed the most in the cylinder.

However, a variation in the position of the plunger is large in both a method of using the pressure of the plasticized material and a method of pushing the plunger using a finger of an operator. Therefore, there is a problem in that an origin position of the plunger cannot be set accurately.

SUMMARY

A material feeding device includes a plasticizing unit configured to plasticize a material to generate a plasticized material; a nozzle that has a nozzle opening and is configured to send out the plasticized material from the nozzle opening to the outside; a flow path that communicates with the nozzle opening and through which the plasticized material flows; a suction unit including a plunger configured to suction the plasticized material into a cylinder coupled to the flow path, and a motor configured to drive the plunger; and a detection unit configured to detect a position of the plunger in the cylinder.

A three-dimensional shaping device includes the material feeding device described above, and a stage that receives the plasticized material discharged from the nozzle of the material feeding device.

An injection molding device includes the material feeding device described above and a support portion that detachably supports a mold, and injects the plasticized material from the nozzle of the material feeding device toward the mold.

DESCRIPTION OF EXEMPLARY EMBODIMENTS

First Embodiment

Figure 1:
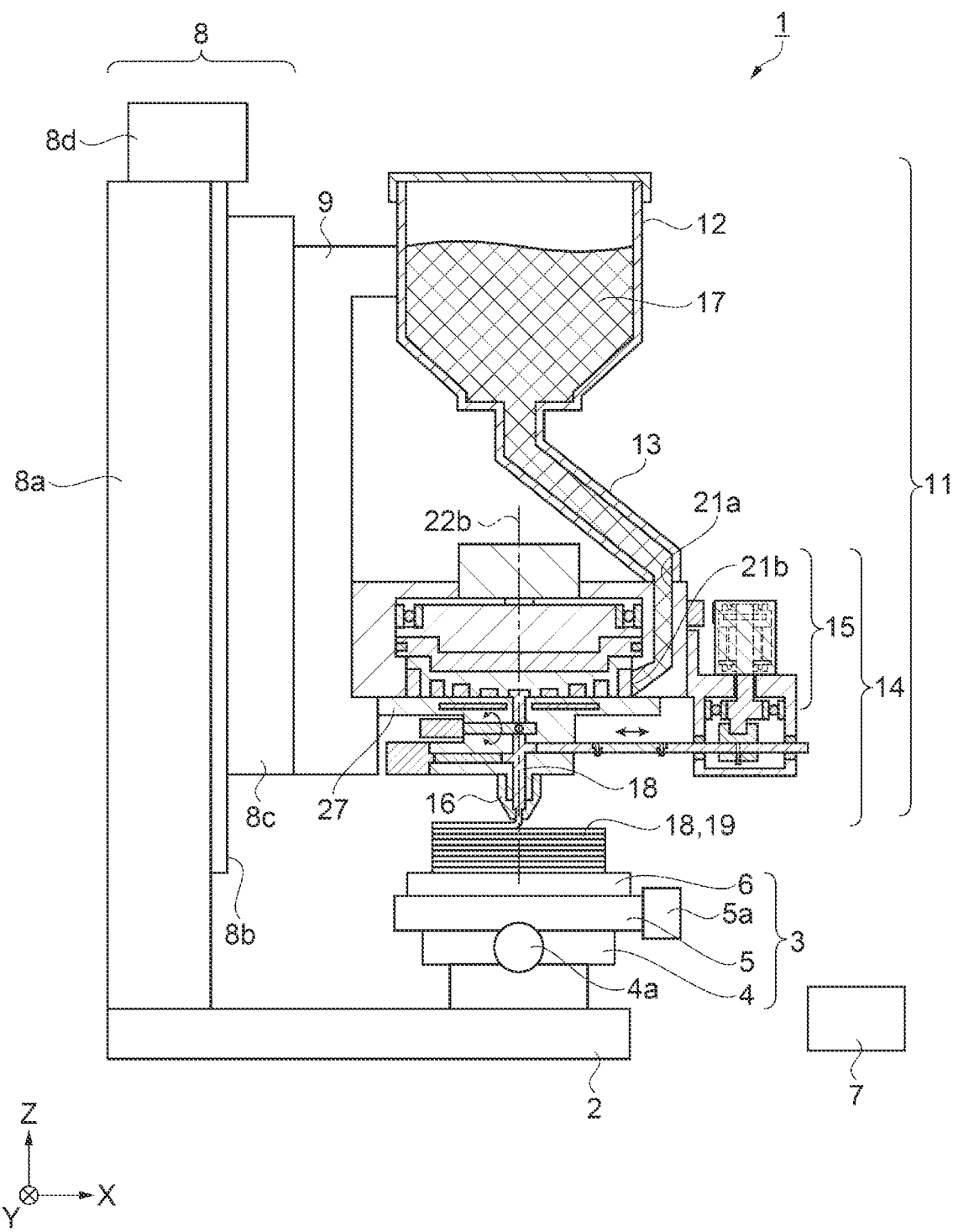
FIG. 1 is a schematic diagram showing a configuration of a three-dimensional shaping device according to a first embodiment.

In the present embodiment, a feature example of a three-dimensional shaping device including a material feeding device will be described with reference to the drawings. Arrows along X, Y, and Z directions that are orthogonal to one another are shown in FIG. 1. The X direction and the Y direction are directions along a horizontal direction, and the Z direction is a direction along a vertical direction. The direction of gravity is a Z negative direction.

As shown in FIG. 1, a three-dimensional shaping device 1 includes a base 2. A stage 3 is disposed on the base 2. A Y stage 4, an X stage 5, and a reception plate 6 are stacked in this order in a Z positive direction on the stage 3.

The Y stage 4 includes a Y axis motor 4a, a ball screw, a Y axis scale, and the like. The Y stage 4 causes the reception plate 6 to reciprocate in the Y direction. The X stage 5 includes an X axis motor 5a, a ball screw, an X axis scale, and the like. The X stage 5 causes the reception plate 6 to reciprocate in the X direction.

The three-dimensional shaping device 1 includes a control unit 7. The control unit 7 controls movements of the Y stage 4 and the X stage 5. The control unit 7 recognizes a position of the reception plate 6 in the Y direction based on information output from the Y axis scale. The control unit 7 recognizes a position of the reception plate 6 in the X direction based on information output from the X axis scale. The control unit 7 moves the Y stage 4 and the X stage 5 so as to eliminate a difference between a current position and a target position where the reception plate 6 is to be moved. The control unit 7 controls a trajectory along which the reception plate 6 is moved by sequentially changing the target position where the reception plate 6 is to be moved.

An elevating stage 8 is provided on the base 2 at an X negative direction side. The elevating stage 8 includes a fixed table 8a, and the fixed table 8a stands on the base 2. A rail 8b is provided on a surface of the fixed table 8a at an X positive direction side. A movement table 8c is provided at an X positive direction side of the rail 8b. The movement table 8c moves in the Z direction along the rail 8b.

A Z axis motor 8d is provided at a Z positive direction side of the fixed table 8a. The fixed table 8a is internally provided with a ball screw and a Z axis scale. Similar to the Y stage 4 and the X stage 5, the control unit 7 controls a movement of the movement table 8c.

A unit support portion 9 is provided at an X positive direction side of the movement table 8c. A shaping unit 11 is provided at an X positive direction side of the unit support portion 9, and the unit support portion 9 supports the shaping unit 11. The shaping unit 11 is provided with a material supply unit 12, a coupling pipe 13, and a material feeding device 14 that are arranged in this order in the Z negative direction. As described above, the three-dimensional shaping device 1 includes the material feeding device 14. The material feeding device 14 includes a plasticizing unit 15 and a nozzle 16.

The present embodiment is configured such that the stage 3 moves in the X direction and the Y direction and the shaping unit 11 moves in the Z direction. A configuration may also be adopted such that the stage 3 does not move and the shaping unit 11 moves in the X, Y, and Z directions. A configuration may also be adopted such that the stage 3 moves in the Z direction and the shaping unit 11 moves in the X direction and the Y direction. A configuration may also be adopted such that the stage 3 moves in the X, Y, and Z directions.

The material supply unit 12 is a container having a cavity therein. Resin pellets 17 serving as a material are stored inside the material supply unit 12. The resin pellets 17 are in a form of pellets. A size of the resin pellets 17 is not particularly limited. For example, the size of the resin pellets 17 is in a range of 5 mm to 20 mm in the present embodiment. The resin pellets 17 include a material obtained by containing metal, ceramic, carbon fiber, or the like in resin, or a material containing resin only.

The coupling pipe 13 is coupled to the bottom of the material supply unit 12. The resin pellets 17 are moved by own weight of the resin pellets 17 from the inside of the material supply unit 12 to the inside of the coupling pipe 13. The coupling pipe 13 is coupled to the plasticizing unit 15. The resin pellets 17 are supplied from the coupling pipe 13 to the plasticizing unit 15.

The plasticizing unit 15 plasticizes the resin pellets 17. The term "plasticize" is a concept including melting, and refers to a change from a solid state to a state having fluidity. Specifically, in a case of a material in which glass transition occurs, the term "plasticize" refers to setting a temperature of the material to be a glass transition point or higher. In a case of a material in which glass transition does not occur, the term "plasticize" refers to setting a temperature of the material to be a melting point or higher. The plasticizing unit 15 plasticizes the resin pellets 17 to generate a plasticized material 18.

The nozzle 16 discharges the plasticized material 18 supplied from the plasticizing unit 15 to the reception plate 6. The reception plate 6 of the stage 3 receives the plasticized material 18 discharged from the nozzle 16. While the nozzle 16 discharges the plasticized material 18, the control unit 7 moves the reception plate 6 in the X direction and the Y direction. As a result, the three-dimensional shaping device 1 forms a layer of a predetermined pattern on the reception plate 6. This layer is a first layer.

Next, the elevating stage 8 moves the shaping unit 11 in the Z positive direction by a predetermined distance. The three-dimensional shaping device 1 forms a second layer in a manner of overlapping the first layer. Further, the three-dimensional shaping device 1 forms third and subsequent layers in an overlapping manner to form a three-dimensional shaped object 19. The shaped object 19 is shaped using the plasticized material 18 sent out from the nozzle 16.

Figure 2:
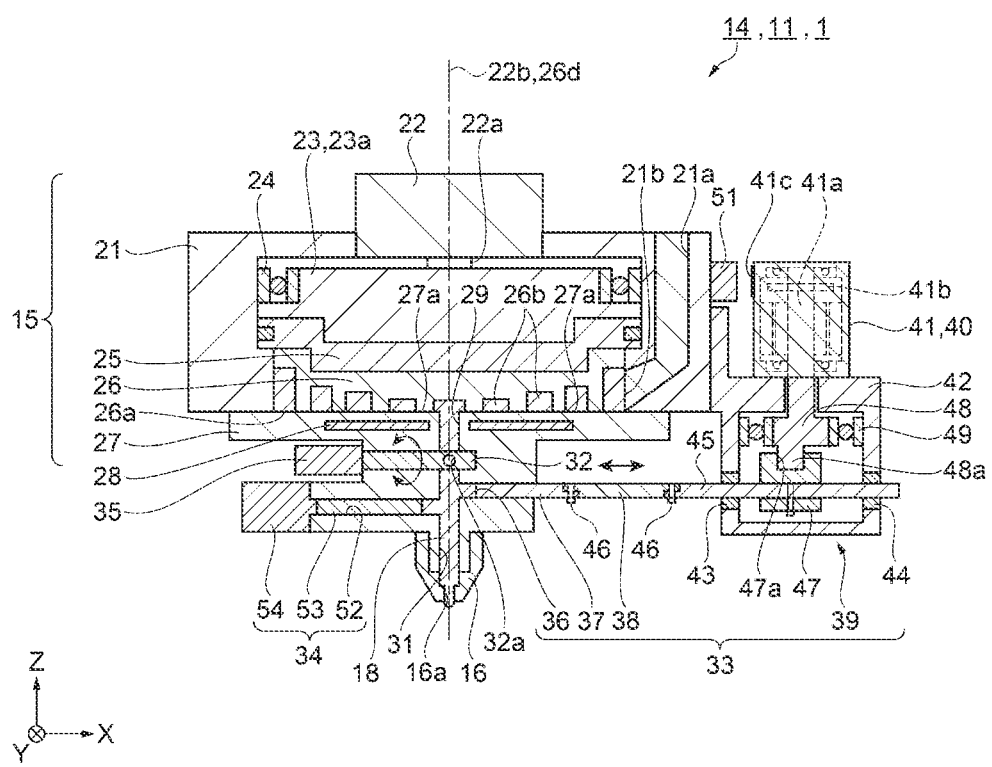
FIG. 2 is a schematic side cross-sectional view showing a configuration of a material feeding device.

As shown in FIG. 2, the plasticizing unit 15 includes a screw case 21. The inside of the screw case 21 is hollow. A screw motor 22 is provided at the Z positive direction side of the screw case 21. A rotation angle, a rotation speed, a rotation starting timing, and a rotation stopping timing of the screw motor 22 are controlled by the control unit 7.

A speed reducer 23 is coupled to a rotation shaft 22a of the screw motor 22. When the rotation shaft 22a rotates at a high speed, an outer peripheral side of the speed reducer 23 rotates at a reduced low speed. The outer peripheral side of the speed reducer 23 which rotates at a low speed serves as an output shaft 23a. A first bearing 24 is provided at the outer peripheral side of the speed reducer 23. The first bearing 24 is disposed between the screw case 21 and the speed reducer 23. The first bearing 24 rotatably supports the speed reducer 23.

A screw support portion 25 is provided at the output shaft 23a of the speed reducer 23. A flat screw 26 is provided on the screw support portion 25. The flat screw 26 is rotated by the screw motor 22. The flat screw 26 rotates in synchronization with the output shaft 23a. The flat screw 26 rotates about the rotation shaft 22a of the screw motor 22. A screw rotation center 26d that is a rotation center of the flat screw 26 is coaxial with a motor rotation center 22b that is a rotation center of the screw motor 22.

Figure 3:
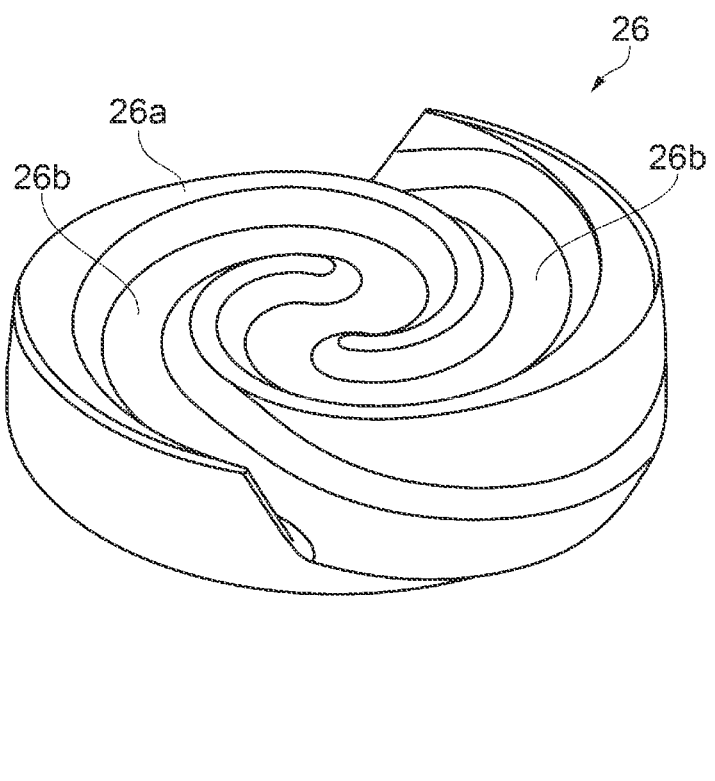
FIG. 3 is a schematic perspective view showing a flat screw.

As shown in FIGS. 2 and 3, the flat screw 26 has a groove-formed surface 26a in which a spiral groove 26b is formed. The flat screw 26 has a substantially cylindrical shape in which a size of the flat screw 26 in an axial direction of the rotation shaft 22a is smaller than a size of the flat screw 26 in a direction orthogonal to the axial direction of the rotation shaft 22a. Although two grooves 26b are provided in the example shown in the drawings, the number of the grooves 26b is not particularly limited. Although not shown, three or more grooves 26b may be provided, or one groove 26b may be provided alone.

The screw case 21 accommodates the speed reducer 23, the screw support portion 25, and the flat screw 26. As shown in FIGS. 1 and 2, the screw case 21 includes a supply path 21a coupled to the coupling pipe 13. The supply path 21a is continuous from the coupling pipe 13 to the flat screw 26. An opening of the supply path 21a at the flat screw 26 side serves as a passage port 21b. The screw case 21 is provided with the passage port 21b through which the resin pellets 17 pass toward the flat screw 26.

A barrel 27 is provided at the Z negative direction side of the flat screw 26. The flat screw 26 rotates relative to the barrel 27.

As shown in FIG. 2, the barrel 27 has a facing surface 27a that faces the groove-formed surface 26a. A heater 28 is provided in the barrel 27 at a position facing the groove 26b. The heater 28 is a ceramic heater in which an electric heating wire is disposed in a ceramic pipe.

The heater 28 heats the resin pellets 17 supplied to a space between the flat screw 26 and the barrel 27. Specifically, the heater 28 heats the resin pellets 17 supplied to a space between the groove-formed surface 26a and the facing surface 27a. The heated resin pellets 17 are plasticized to generate the plasticized material 18. The barrel 27 is provided with a communication hole 29 into which the plasticized material 18 obtained by plasticizing the resin pellets 17 flows.

The nozzle 16 has a nozzle opening 16a. The nozzle 16 sends the plasticized material 18 from the nozzle opening 16a to the outside. The barrel 27 and the nozzle 16 include a flow path 31 through which the plasticized material 18 flows. The flow path 31 communicates with the nozzle opening 16a. The flow path 31 is formed between the communication hole 29 and the nozzle opening 16a. The flow path 31 is disposed along the motor rotation center 22b.

The barrel 27 is provided with a flow rate adjusting unit 32, a suction unit 33, and a pressure detection unit 34 that are arranged in this order from the communication hole 29 toward the nozzle opening 16a. The flow rate adjusting unit 32, the suction unit 33, and the pressure detection unit 34 are coupled to the flow path 31.

The flow rate adjusting unit 32 has a rod shape elongated in the X direction. The flow rate adjusting unit 32 has a through hole 32a in a radial direction. The flow rate adjusting unit 32 is orthogonal to the flow path 31. The through hole 32a is disposed in the flow path 31. A valve motor 35 is disposed at the X negative direction side of the flow rate adjusting unit 32. The flow rate adjusting unit 32 is coupled to a rotation shaft of the valve motor 35. The valve motor 35 rotates the flow rate adjusting unit 32. When an axial direction of the through hole 32a is parallel to the motor rotation center 22b, the plasticized material 18 easily passes through the through hole 32a. When the axial direction of the through hole 32a is orthogonal to the motor rotation center 22b, the plasticized material 18 cannot pass through the through hole 32a. The valve motor 35 changes an angle of the axial direction of the through hole 32a relative to the motor rotation center 22b, so that a flow rate of the plasticized material 18 flowing through the flow path 31 can be adjusted. The flow rate indicates a movement amount per unit time.

The suction unit 33 includes a first cylinder 36 serving as a cylinder, a plunger 37, a coupling rod 38, a Scotch yoke mechanism 39, and a plunger motor 41 serving as a motor and a detection unit. The plunger motor 41 is provided in a detection unit 40. The first cylinder 36 is a hole formed in the barrel 27. One end of the first cylinder 36 is coupled to the flow path 31. The plunger 37 is accommodated in the first cylinder 36 and slides along the first cylinder 36. When the plunger 37 moves in a direction away from the flow path 31, the plunger 37 suctions the plasticized material 18 into the first cylinder 36. When the plunger 37 moves in a direction coming close to the flow path 31, the suction unit 33 discharges the plasticized material 18 in the first cylinder 36 to the flow path 31.

The Scotch yoke mechanism 39 includes a housing 42. The housing 42 is screwed to the screw case 21. A first bearing 43 and a second bearing 44 are provided in the housing 42 at the X positive direction side of the plunger 37. A reciprocating rod 45 is provided in a manner of passing through the first bearing 43 and the second bearing 44. The coupling rod 38 couples the plunger 37 and the reciprocating rod 45. The first bearing 43 and the second bearing 44 have a solid lubricant. The reciprocating rod 45 slides in the X positive direction and the X negative direction with low friction relative to the first bearing 43 and the second bearing 44. The reciprocating rod 45 has a prismatic shape and has a structure that does not rotate.

The plunger 37 and the coupling rod 38 are fixed to each other by a screw 46. The reciprocating rod 45 and the coupling rod 38 are fixed to each other by a screw 46. The coupling rod 38 is detachable by operating the screws 46. The coupling rod 38 is detached from the plunger 37 and the reciprocating rod 45. Thereafter, the plunger 37 can be removed from the first cylinder 36. Therefore, the plunger 37 can be replaced.

A yoke 47 is screwed to the reciprocating rod 45. The yoke 47 has a groove 47a in a surface at the Z positive direction. The plunger motor 41 is provided at the Z positive direction side of the housing 42. An encoder 41b is provided at an output shaft 41a of the plunger motor 41. The encoder 41b detects a rotation angle of the output shaft 41a. A crank pin 48 is fixed to the output shaft 41a. A second bearing 49 is disposed between the crank pin 48 and the housing 42. The crank pin 48 is rotatably held by the second bearing 49. A crankshaft 48a of the crank pin 48 is inserted into the groove 47a of the yoke 47.

The plunger motor 41 rotates the crank pin 48. The crankshaft 48a reciprocates in the X direction when viewed from the Y direction. The crankshaft 48a causes the yoke 47 to reciprocate in the X direction. The reciprocating rod 45 fixed to the yoke 47, the coupling rod 38, and the plunger 37 reciprocate in the X direction. In this manner, the plunger motor 41 drives the plunger 37.

The plunger motor 41 includes an identification (ID) mark 41c on a surface facing the screw case 21. An imaging device 51 is disposed in the screw case 21 at a position facing the ID mark 41c. The imaging device 51 captures an image of the ID mark 41c.

The pressure detection unit 34 includes a second cylinder 52, a relay rod 53, and a pressure sensor 54 serving as a pressure detection unit. The second cylinder 52 is a hole formed in the barrel 27. One end of the second cylinder 52 is coupled to the flow path 31. The relay rod 53 is accommodated in the second cylinder 52 and slides along the second cylinder 52.

The pressure sensor 54 is coupled to an end of the second cylinder 52 at the X negative direction side. The plasticized material 18 flowing through the flow path 31 comes into contact with the relay rod 53. A pressure in the flow path 31 presses the pressure sensor 54 via the relay rod 53. The pressure sensor 54 detects a pressure of the plasticized material 18 flowing in the flow path 31. A temperature of the plasticized material 18 flowing through the flow path 31 is high, and may reach about 400° C. The relay rod 53 preferably has a heat insulation property. For example, the relay rod 53 may be made hollow and brought into a vacuum state.

Figure 4:
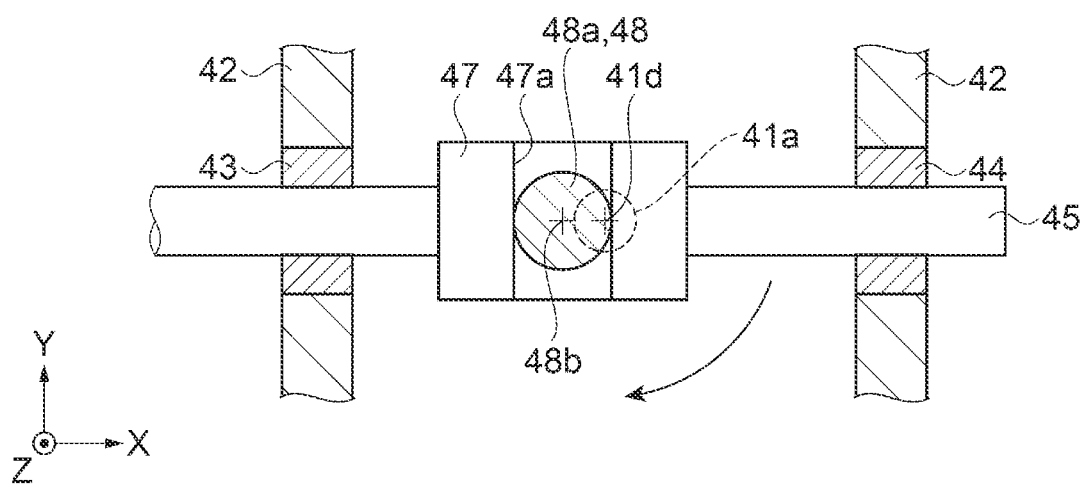
FIG. 4 is a schematic plan view showing a Scotch yoke mechanism.

Next, a movement of the Scotch yoke mechanism 39 will be described. As shown in FIG. 4, the rotation center 41d of the output shaft 41a of the plunger motor 41 and a center 48b of the crankshaft 48a are separated from each other. When the center 48b of the crankshaft 48a is located in the X negative direction of the rotation center 41d, the reciprocating rod 45 is located at the X negative direction side within an operation range.

Figure 5:
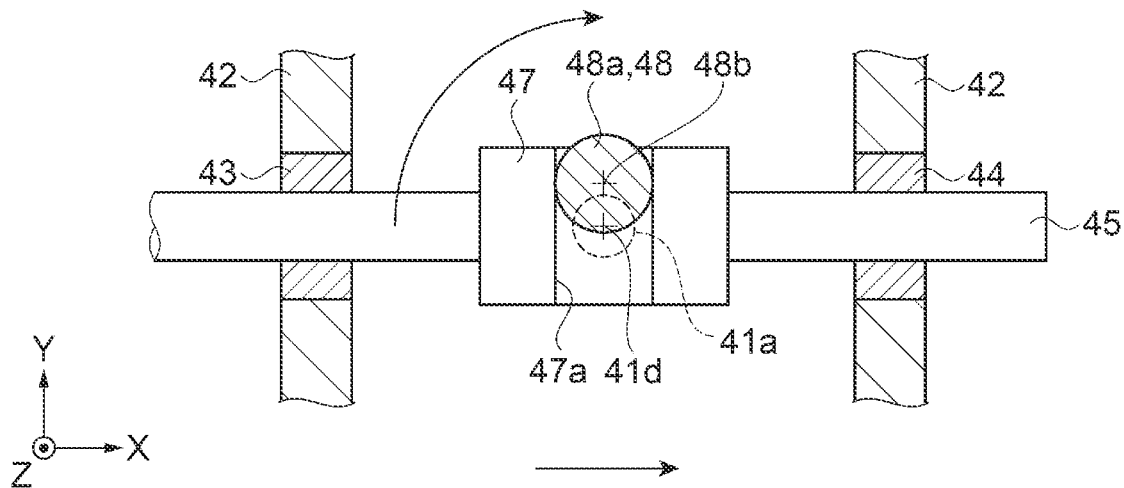
FIG. 5 is a schematic plan view showing the Scotch yoke mechanism.

The output shaft 41a of the plunger motor 41 rotates clockwise by 90 degrees. The crank pin 48 rotates clockwise by 90 degrees relative to the rotation center 41d. As shown in FIG. 5, the center 48b of the crankshaft 48a is located in the Y positive direction of the rotation center 41d. The reciprocating rod 45 is located at the center of the operation range.

Figure 6:
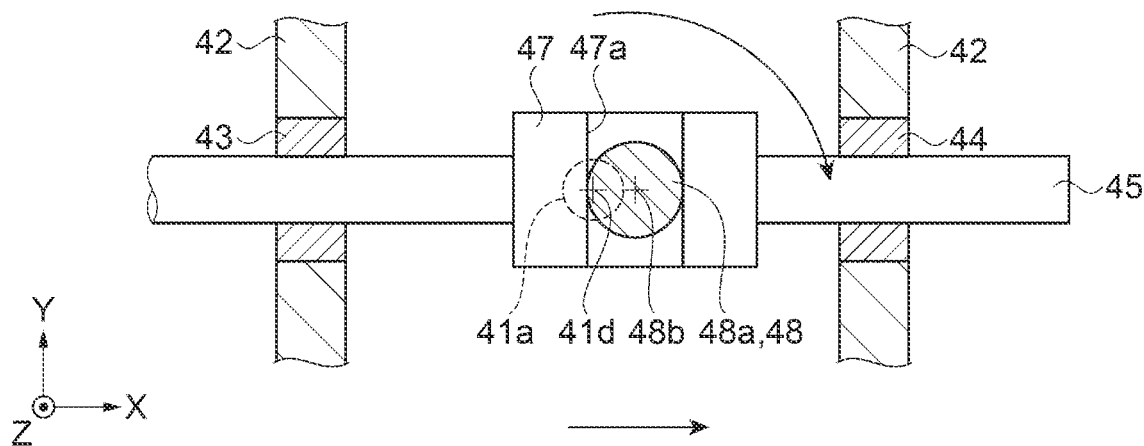
FIG. 6 is a schematic plan view showing the Scotch yoke mechanism.

Further, the output shaft 41a of the plunger motor 41 rotates clockwise by 90 degrees. The crank pin 48 rotates clockwise by 90 degrees relative to the rotation center 41d. As shown in FIG. 6, the center 48b of the crankshaft 48a is located in the X positive direction of the rotation center 41d. The reciprocating rod 45 is located at the X positive direction side within the operation range.

Figure 7:
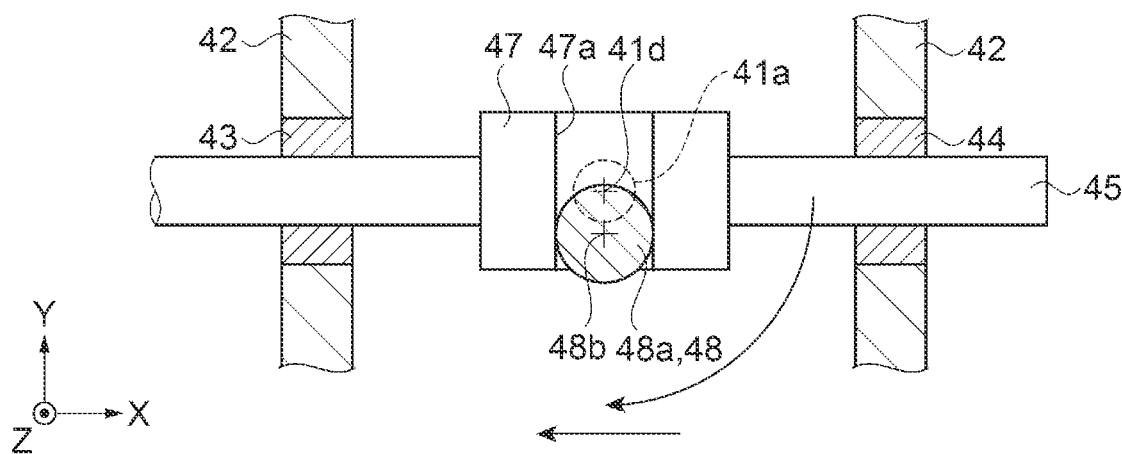
FIG. 7 is a schematic plan view showing the Scotch yoke mechanism.

Further, the output shaft 41a of the plunger motor 41 rotates clockwise by 90 degrees. The crank pin 48 rotates clockwise by 90 degrees relative to the rotation center 41d. As shown in FIG. 7, the center 48b of the crankshaft 48a is located in the Y negative direction of the rotation center 41d. The reciprocating rod 45 is located at the center of the operation range.

Figure 8:
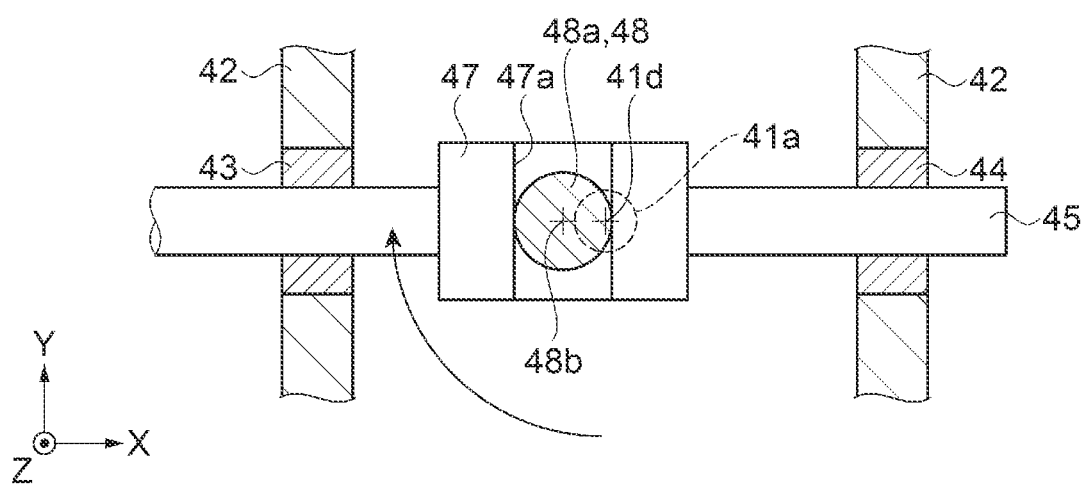
FIG. 8 is a schematic plan view showing the Scotch yoke mechanism.

Further, the output shaft 41a of the plunger motor 41 rotates clockwise by 90 degrees. The crank pin 48 rotates clockwise by 90 degrees relative to the rotation center 41d. As shown in FIG. 8, the center 48b of the crankshaft 48a is located in the X negative direction of the rotation center 41d. The reciprocating rod 45 is located at the X negative direction side within the operation range. When the output shaft 41a of the plunger motor 41 rotates once, the yoke 47 and the reciprocating rod 45 reciprocate once.

In the suction unit 33, the output shaft 41a of the plunger motor 41 and the plunger 37 are coupled to each other via the Scotch yoke mechanism 39. According to this configuration, the suction unit 33 includes the Scotch yoke mechanism 39. The scotch yoke mechanism 39 can press the plunger 37 more strongly than a rack and pinion mechanism. The scotch yoke mechanism 39 can pull the plunger 37 more strongly than a rack and pinion mechanism. Therefore, the plasticized material 18 can be drawn into the first cylinder 36 from the flow path 31, and the plasticized material 18 can be pushed out to the flow path 31.

When a flow rate of the plasticized material 18 discharged from the nozzle opening 16a during shaping is constant, the plunger 37 does not operate. When the flow rate of the plasticized material 18 discharged from the nozzle opening 16a is increased, the increase in the flow rate of the plasticized material 18 supplied from the flat screw 26 side is delayed. The plunger 37 pushes out the plasticized material 18 in the first cylinder 36 to make up an increase delay of the flow rate. When the flow rate of the plasticized material 18 discharged from the nozzle opening 16a is reduced, the reduction in the flow rate of the plasticized material 18 supplied from the flat screw 26 side is delayed. The plunger 37 draws the plasticized material 18 from the flow path 31 into the first cylinder 36 to make up a reduction delay of the flow rate.

Figure 9:
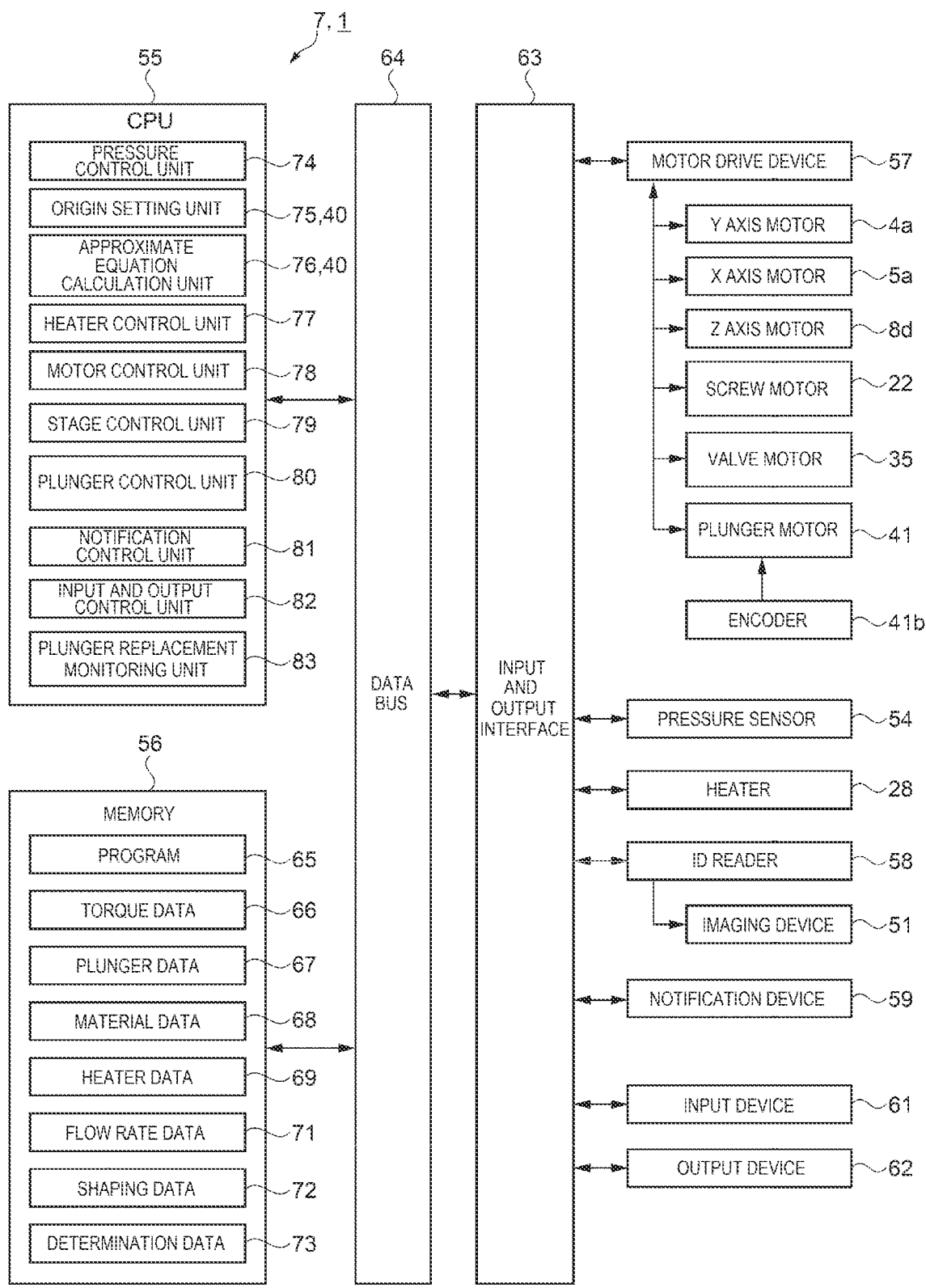
FIG. 9 is an electrical block diagram showing the three-dimensional shaping device.

As shown in FIG. 9, the control unit 7 includes a central processing unit (CPU) 55 that executes various processing, and a memory 56 that stores various kinds of information. The CPU 55 is coupled to a motor drive device 57, the pressure sensor 54, the heater 28, an ID reader 58, a notification device 59 serving as a notification unit, an input device 61, and an output device 62 serving as a notification unit via an input and output interface 63 and a data bus 64.

The motor drive device 57 drives the Y axis motor 4a, the X axis motor 5a, the Z axis motor 8d, the screw motor 22, the valve motor 35, and the plunger motor 41. The motor drive device 57 receives an instruction signal from the CPU 55 and drives the Y axis motor 4a, the X axis motor 5a, the Z axis motor 8d, the screw motor 22, the valve motor 35, and the plunger motor 41 under a condition indicated by the instruction signal.

In addition, the motor drive device 57 converts a rotation angle of the output shaft 41a of the plunger motor 41 detected by the encoder 41b into angle information and transmits the angle information to the CPU 55.

The plunger motor 41 is a DC motor. A current flowing through a coil of the plunger motor 41 is in proportional to a torque of the output shaft 41a. The motor drive device 57 calculates the torque of the output shaft 41a based on the current flowing through the coil of the plunger motor 41. The motor drive device 57 converts the torque of the output shaft 41a into torque information and transmits the torque information to the CPU 55.

The pressure sensor 54 detects a pressure of the plasticized material 18 flowing through the flow path 31. The pressure sensor 54 converts the detected pressure into pressure information and transmits the pressure information to the CPU 55.

The heater 28 includes a control circuit that controls temperature. The heater 28 receives an instruction signal from the CPU 55 and maintains temperature indicated by the instruction signal.

The ID reader 58 is electrically coupled to the imaging device 51. The imaging device 51 captures an image of the ID mark 41c and transmits image data of the ID mark 41c to the ID reader 58. The ID reader 58 performs image processing on the image data, extracts ID information, and transmits the ID information to the CPU 55.

The notification device 59 includes a speaker and a light. The notification device 59 receives an alert signal from the CPU 55 and drives the speaker and the light. The notification device 59 converts contents of an alert from the speaker into a sound. The notification device 59 cause the light to blink so as to alert an operator.

The input device 61 is a keyboard, a joystick, or the like. An operator operates the input device 61 to input various instructions.

The output device 62 is a display device, an external output device, or the like. An operator views the display device to check various kinds of information. The output device 62 includes an external interface that communicates with an external device. The display device receives an alert signal from the CPU 55, and displays contents of an alert in a form of characters and figures.

The memory 56 is implemented by a semiconductor memory such as a random access memory (RAM) and a read only memory (ROM). The memory 56 stores a program 65 for describing a procedure of an operation of the three-dimensional shaping device 1.

In addition, the memory 56 stores torque data 66. The torque data 66 is data of a torque of the output shaft 41a of the plunger motor 41. The torque data 66 includes a value of a torque of the output shaft 41a calculated by the motor drive device 57.

In addition, the memory 56 stores plunger data 67. The plunger data 67 includes information indicating an attribute such as a length of the plunger 37, a management number indicated by the ID mark 41c, and the like. The plunger data 67 includes information about a replacement date. The plunger data 67 includes data input by an operator using the input device 61.

In addition, the memory 56 stores material data 68. The material data 68 includes a table of types of the resin pellets 17 to be used. The material data 68 includes information indicating a type of the resin pellets 17 to be put into the material supply unit 12.

In addition, the memory 56 stores heater data 69. The heater data 69 includes information about temperature maintained by the heater 28. Temperature information is set for each type of the resin pellets 17.

In addition, the memory 56 stores flow rate data 71. The flow rate data 71 includes a target value of a flow rate of the plasticized material 18 flowing through the flow path 31. The flow rate data 71 includes information indicating a type of the resin pellets 17, a rotation speed of the flat screw 26, and a relationship between the temperature of the heater 28 and the flow rate of the plasticized material 18 flowing through the flow path 31.

In addition, the memory 56 stores shaping data 72. The shaping data 72 is data indicating a procedure of moving the stage 3 and the elevating stage 8 to shape the shaped object 19.

In addition, the memory 56 stores determination data 73. The determination data 73 includes a first determination value and a second determination value for determining a pressure of the plasticized material 18 flowing through the flow path 31. The determination data 73 includes a determination value for determining whether a state is an abnormal state. In addition, the memory 56 includes a storage area that functions as a work area, a temporary file, or the like for the CPU 55 to operate, and various other storage areas.

The CPU 55 drives the three-dimensional shaping device 1 in accordance with the program 65 stored in the memory 56. The CPU 55 on which the program 65 operates includes a pressure control unit 74 serving as a specific function implementation unit. The pressure control unit 74 outputs an instruction signal to the pressure sensor 54 to detect a pressure of the plasticized material 18 flowing through the flow path 31. The pressure control unit 74 receives, from the pressure sensor 54, a pressure value of the plasticized material 18 flowing through the flow path 31. The pressure control unit 74 receives the first determination value and the second determination value included in the determination data 73 from the memory 56. The first determination value is a lower limit value of a target pressure value of the plasticized material 18 flowing through the flow path 31. The second determination value is an upper limit value of a target pressure value of the plasticized material 18 flowing through the flow path 31.

The pressure control unit 74 causes the motor drive device 57 to adjust a rotation speed of the screw motor 22. A rotation speed of the screw motor 22 and a pressure value of the plasticized material 18 flowing through the flow path 31 have a positive correlation. When the pressure value of the plasticized material 18 flowing through the flow path 31 is smaller than the first determination value, the motor drive device 57 increases the rotation speed of the screw motor 22. When the pressure value of the plasticized material 18 flowing through the flow path 31 is larger than the second determination value, the motor drive device 57 reduces the rotation speed of the screw motor 22.

The pressure control unit 74 repeatedly causes the pressure sensor 54 to detect the pressure value of the plasticized material 18 and causes the motor drive device 57 to adjust the rotation speed of the screw motor 22. The pressure control unit 74 adjusts the rotation speed of the screw motor 22 such that a detection value of the pressure sensor 54 of the pressure detection unit 34 is the first determination value or more and the second determination value or less.

In addition, the CPU 55 includes an origin setting unit 75 serving as a detection unit. The origin setting unit 75 is provided in the detection unit 40. The origin setting unit 75 uses the plunger motor 41 to estimate a relationship between a position of the plunger 37 and the encoder 41b of the plunger motor 41. The encoder 41b is a scale that detects a rotation angle of the output shaft 41a. Then, the origin setting unit 75 sets a correspondence between an origin position of the plunger 37 and an angle of the encoder 41b.

Specifically, the origin setting unit 75 measures an angle of the encoder 41b when the plunger 37 moves to a largest extent in the X positive direction. Next, the origin setting unit 75 calculates an angle of the encoder 41b when the plunger 37 moves to an origin from a position of the plunger 37 where the plunger 37 moves to the largest extent in the X positive direction. A distance between the origin and the position where the plunger 37 moves to a largest extent in the X positive direction is set in advance. According to this procedure, the origin position of the plunger 37 and the angle of the encoder 41b can be associated with each other.

Alternatively, the origin setting unit 75 measures an angle of the encoder 41b when the plunger 37 moves to a largest extent in the X negative direction. Next, the origin setting unit 75 calculates an angle of the encoder 41b when the plunger 37 moves to the origin from a position of the plunger 37 where the plunger 37 moves to the largest extent in the X negative direction. A distance between the origin and the position where the plunger 37 moves to the largest extent in the X negative direction is set in advance. According to this procedure, the origin position of the plunger 37 and the angle of the encoder 41b can be associated with each other.

In addition, the CPU 55 includes an approximate equation calculation unit 76 serving as a detection unit. The approximate equation calculation unit 76 is provided in the detection unit 40. The approximate equation calculation unit 76 performs an approximate equation calculation for a plurality of measurement values indicating a relationship between the position of the plunger 37 and the angle of the encoder 41b. The angle of the encoder 41b when the plunger 37 moves to the largest extent in the X positive direction is calculated. Alternatively, the angle of the encoder 41b when the plunger 37 moves to the largest extent in the X negative direction is calculated.

In addition, the CPU 55 includes a heater control unit 77. The heater data 69 stored in the memory 56 includes temperature information used for plasticizing the resin pellets 17. A plasticization temperature varies depending on a type of the resin pellets 17. The heater control unit 77 receives information about the plasticization temperature corresponding to the resin pellets 17 from the heater data 69 stored in the memory 56. The heater control unit 77 instructs the heater 28 of a temperature at which the resin pellets 17 are plasticized. The heater 28 maintains temperature indicated by an instruction signal.

In addition, the CPU 55 includes a motor control unit 78. The motor control unit 78 outputs an instruction signal to the motor drive device 57 to control the screw motor 22, the valve motor 35, and the plunger motor 41.

In addition, the CPU 55 includes a stage control unit 79. The stage control unit 79 outputs an instruction signal to the motor drive device 57 to control the Y axis motor 4a, the X axis motor 5a, and the Z axis motor 8d.

In addition, the CPU 55 includes a plunger control unit 80. The plunger control unit 80 controls a movement amount of the plunger 37. The plunger control unit 80 controls the movement amount of the plunger 37 to control an amount of the plasticized material 18 taken into the first cylinder 36 from the flow path 31 and an amount of the plasticized material 18 supplied to the flow path 31 from the first cylinder 36.

In addition, the CPU 55 includes a notification control unit 81. When the notification control unit 81 notifies an operator of an abnormality, the notification control unit 81 outputs an instruction signal for issuing an alert to the notification device 59 and the output device 62. The notification device 59 notifies an operator of an alert in accordance with an instruction signal for issuing the alert. A display device provided in the output device 62 displays contents of the alert.

In addition, the CPU 55 includes an input and output control unit 82. The input and output control unit 82 receives information input to the input device 61. The input and output control unit 82 transmits information to a function implementation unit related to the received information. The input and output control unit 82 outputs information to the output device 62. The input and output control unit 82 outputs an instruction signal for displaying or transmitting information to the output device 62.

In addition, the CPU 55 includes a plunger replacement monitoring unit 83. The plunger replacement monitoring unit 83 monitors whether at least a part of the suction unit 33 is replaced or detached. ID information of the plunger motor 41 when a power switch is turned off is included in the plunger data 67 stored in the memory 56. When a power switch of the three-dimensional shaping device 1 is turned on, the plunger replacement monitoring unit 83 inputs ID information included in the plunger data 67 stored in the memory 56.

The plunger replacement monitoring unit 83 instructs the ID reader 58 to acquire ID information indicated by the currently attached ID mark 41c. The plunger replacement monitoring unit 83 receives the ID information from the ID reader 58. The plunger replacement monitoring unit 83 compares the ID information stored in the memory 56 with the ID information indicated by the currently attached ID mark 41c. When the two pieces of ID information are different from each other, it is determined that the suction unit 33 is replaced.

The plunger replacement monitoring unit 83 monitors contents input to the input device 61. When at least a part of the attached suction unit 33 is replaced, an operator inputs replacement contents using the input device 61. At this time, the plunger replacement monitoring unit 83 determines that at least a part of the attached suction unit 33 is replaced.

After the suction unit 33 is replaced, the plunger replacement monitoring unit 83 outputs an instruction signal for causing the origin setting unit 75 to detect the position of the plunger 37. The origin setting unit 75 detects the position of the plunger 37 in accordance with the instruction signal.

In this manner, after at least a part of the attached suction unit 33 is replaced, the origin setting unit 75 detects a position of the plunger 37 in the first cylinder 36. According to this configuration, it is possible to accurately set the origin position of the plunger 37 when the origin position of the plunger 37 is changed by replacing at least a part of the suction unit 33.

The plunger replacement monitoring unit 83 monitors contents input to the input device 61. When at least a part of the attached suction unit 33 is detached, an operator inputs detachment contents using the input device 61. At this time, the plunger replacement monitoring unit 83 determines that at least a part of the attached suction unit 33 is detached.

After at least a part of the suction unit 33 is detached, the origin setting unit 75 detects a position of the plunger 37 in the first cylinder 36. According to this configuration, it is possible to accurately set the origin position of the plunger 37 when the origin position of the plunger 37 is changed by detaching at least a part of the suction unit 33.

Figure 10:
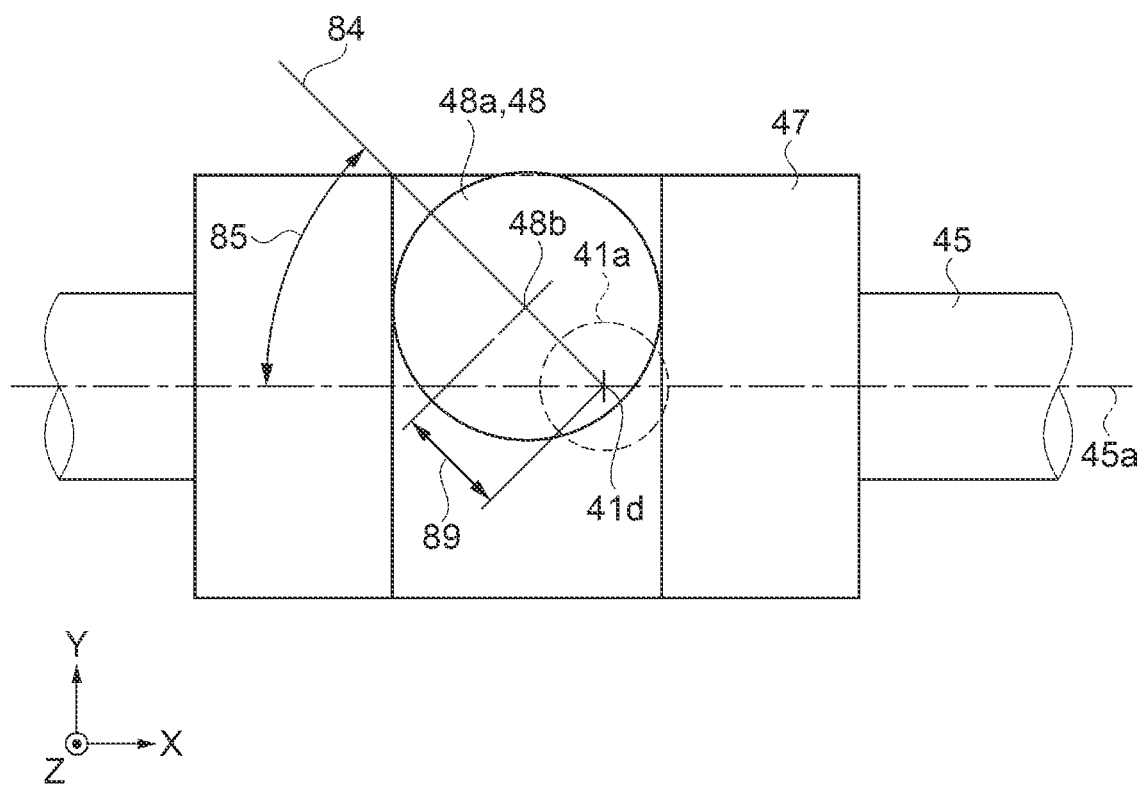
FIG. 10 is a schematic plan view showing the Scotch yoke mechanism.

Next, a method for detecting a position of the plunger 37 will be described. As shown in FIG. 10, a line passing through the rotation center 41d of the plunger motor 41 and the center 48b of the crankshaft 48a of the crank pin 48 is a crank line 84. An angle formed by the crank line 84 and a central axis 45a of the reciprocating rod 45 is a crank angle 85. When the output shaft 41a of the plunger motor 41 rotates, the crank angle 85 changes from 0 degrees to 360 degrees. The flat screw 26 applies a pressure that is the first determination value or more and the second determination value or less to the plasticized material 18 in the flow path 31. When the plasticized material 18 flows through the flow path 31, the pressure applied to the plasticized material 18 is applied to the reciprocating rod 45 via the plunger 37.

When a position of the plunger 37 is detected, the through hole 32a of the flow rate adjusting unit 32 is made parallel to the motor rotation center 22b. The plasticized material 18 easily passes through the through hole 32a. The nozzle opening 16a remains in an open state. A rotation speed of the flat screw 26 is set in accordance with a material of the resin pellets 17. The rotation speed of the flat screw 26 is not particularly limited, and the rotation speed is, for example, 6 rpm in the present embodiment. When the pressure of the plasticized material 18 is low, the rotation speed of the flat screw 26 is increased.

Figure 11:
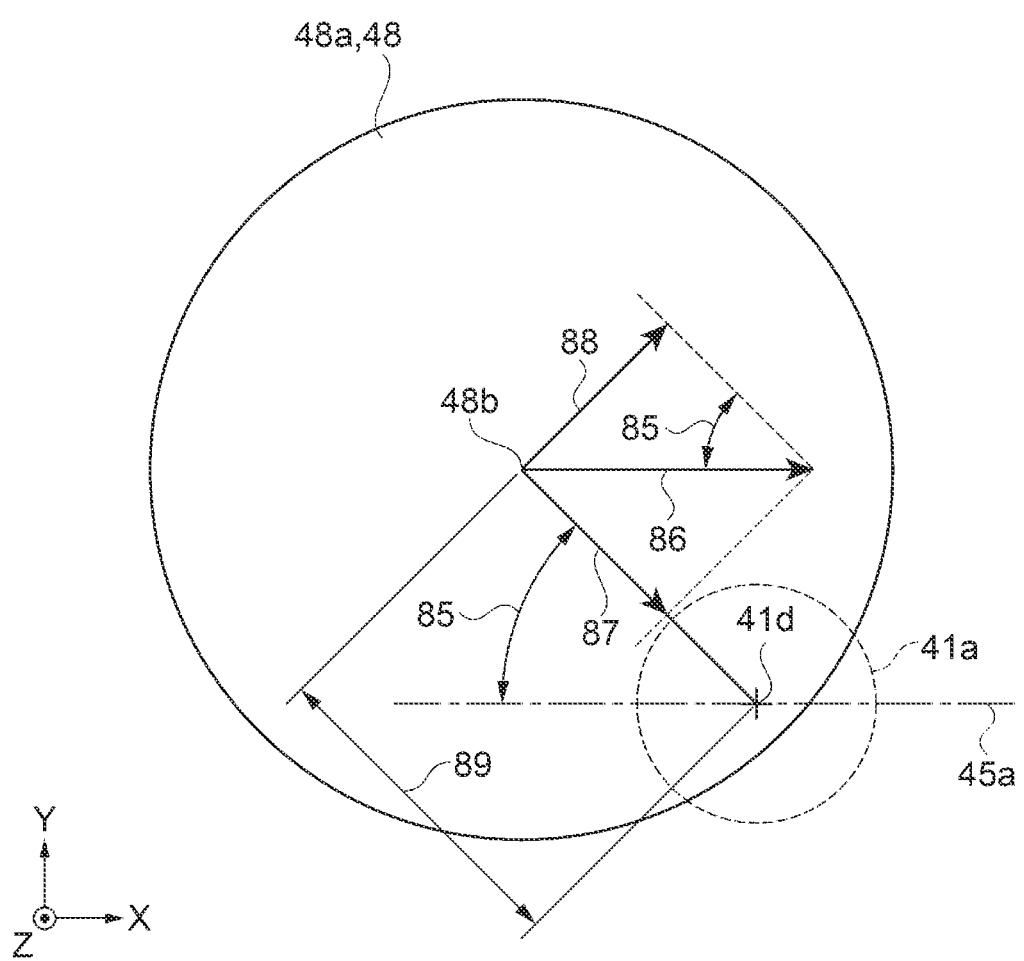
FIG. 11 is a diagram showing a holding torque applied to an output shaft of a plunger motor.

As shown in FIG. 11, a crank pressing force 86 of the yoke 47 presses the crankshaft 48a. A direction in which the yoke 47 pushes the crank pin 48 is an axial direction of the reciprocating rod 45. When the yoke 47 is stopped, the crank pressing force 86 and a force at which the crank pin 48 presses the yoke 47 have the same magnitude.

The crank pressing force 86 is a force obtained by adding a radial component force 87 directed from the center 48b of the crank pin 48 toward the rotation center 41d of the output shaft 41a and a circumferential component force 88 directed in a circumferential direction of the output shaft 41a. The crank angle 85 is defined as "θ", the crank pressing force 86 is defined as "F", and the circumferential component force 88 is defined as "F1". F1=F×sin(θ).

A distance between the rotation center 41d and the center 48b of the crank pin 48 is an eccentricity 89. A torque applied to the output shaft 41a of the plunger motor 41 is defined as "T", and the eccentricity 89 is defined as "r". T=F1×r. Therefore, T=F×r×sin(θ).

The torque applied to the output shaft 41a of the plunger motor 41 is the smallest when the yoke 47 moves to the largest extent in the X positive direction and when the yoke 47 moves to the largest extent in the X negative direction in an operation range of the yoke 47. Therefore, a relationship between the angle of the encoder 41b and the position of the yoke 47 can be detected by detecting the angle of the encoder 41b when the torque applied to the output shaft 41a of the plunger motor 41 is the smallest.

Figure 12:
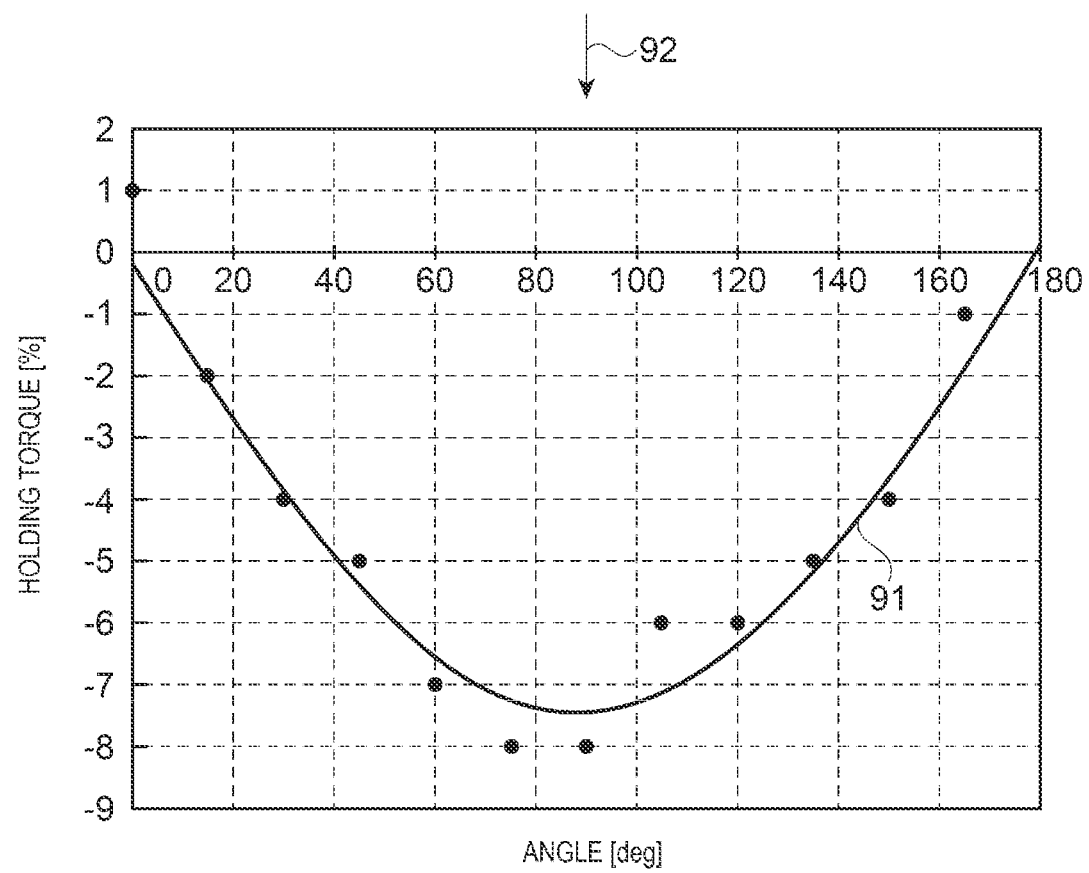
FIG. 12 is a diagram showing a relationship between an angle of an encoder and a holding torque of the plunger motor.

In FIG. 12, a horizontal axis represents the angle of the encoder 41b. A vertical axis represents a holding torque required for the plunger motor 41 to hold the rotation of the output shaft 41a in a stopped state. The holding torque is smaller at a lower side than at an upper side. The holding torque is detected each time the output shaft 41a is rotated by 15 degrees. Then, the detected holding torque is plotted relative to a rotation angle of the output shaft 41a.

The approximate equation calculation unit 76 calculates an approximate curve 91 for plotted data. The approximate curve 91 is a curve of a trigonometric function. The approximate equation calculation unit 76 approximates the plotted data using "A" and "B" as coefficients according to an approximate equation of T=A×sin(θ−B). The origin setting unit 75 sets a place where a value of the holding torque indicated by the approximate curve 91 is the smallest as a reference point 92. The reference point 92 is one of the position where the yoke 47 moves to the largest extent in the X positive direction and the position where the yoke 47 moves to the largest extent in the X negative direction in the operation range of the yoke 47. In this manner, the origin setting unit 75 and the plunger motor 41 detect a position of the plunger 37 in the first cylinder 36.

According to this configuration, the detection unit 40 including the origin setting unit 75 and the plunger motor 41 can detect the position of the plunger 37. Therefore, the plunger 37 can be accurately operated. The origin position of the plunger 37 can be set accurately.

The origin setting unit 75 sets, as the origin, a place at an angle that is separated from the angle of the encoder 41b indicated by the reference point 92 by a predetermined angle. The reference point 92 may be the origin. The angle of the encoder 41b and the position of the plunger 37 accurately correspond to each other. In FIG. 10, the crank angle 85 is indicated by "θ", the eccentricity 89 is indicated by "r", and the Y positive direction side is indicated by "+". A position of the center 48b of the crank pin 48 relative to the rotation center 41d of the output shaft 41a in the axial direction of the central axis 45a is indicated by r×(−cos(θ)). In a case where θ is close to 90 degrees, a movement amount of the crank pin 48 relative to a change of θ is large and has linearity as compared with a case where θ is close to 0 degree or close to 180 degrees. Therefore, the origin is set to a place where θ is close to 90 degrees. Specifically, the origin is set such that θ is in a range from 60 degrees to 90 degrees. The output shaft 41a stands by at an angle corresponding to the origin. At this time, the suction unit 33 can suction a large amount of the plasticized material 18 as compared with a case where the origin is set such that θ is in a range from 90 degrees to 120 degrees.

It is preferable that the detection unit 40 including the origin setting unit 75 and the plunger motor 41 detects a position of the plunger 37 in the first cylinder 36 based on a torque value of the plunger motor 41 when the plunger 37 is held at a predetermined position under a condition that a pressure in a predetermined range is applied to the plunger 37.

According to this configuration, the origin setting unit 75 detects a position of the plunger 37 using the plunger motor 41. Therefore, since no sensors are provided to detect a position of the plunger 37, the number of components can be reduced.

It is preferable that the origin setting unit 75 detects a position of the plunger 37 in the first cylinder 36 based on a plurality of torque values of a holding torque. According to this configuration, torque values at a plurality of positions are detected by changing a position of the plunger 37. Since a detection error can be reduced by obtaining the approximate equation of the approximate curve 91 using a plurality of pieces of data of positions of the plunger 37 and torque values of a holding torque, a relationship between a position of the plunger 37 and a torque value of a holding torque can be obtained accurately. It is possible to reduce a measurement error of the reference point and the origin to 4% or less by obtaining the approximate equation of the approximate curve 91.

A plurality of torque values of a holding torque when the plunger 37 is stopped at a predetermined position may be detected. An approximate equation may be obtained using the plurality of detected torque values. It is preferable that the origin setting unit 75 detects a position of the plunger 37 in the first cylinder 36 based on the plurality of torque values of a holding torque. According to this configuration, since the number of detected torque values increases, errors are reduced. Therefore, a torque value can be detected with high accuracy.

It is preferable that the detection unit 40 including the origin setting unit 75 and the plunger motor 41 detects a position of the plunger 37 in the first cylinder 36 before shaping of the shaped object 19 is started. According to this configuration, the shaped object 19 is shaped after the position of the plunger 37 is detected. Since the origin position of the plunger 37 is detected with high accuracy, the material feeding device 14 can feed the plasticized material 18 from the nozzle opening 16a with high accuracy. Therefore, when the shaped object 19 is shaped, the plunger 37 can be operated accurately.

When at least one of a type of the plasticized material 18, a temperature condition of the heater 28 of the plasticizing unit 15, or a flow rate in the plasticizing unit 15 changes, a torque value of a holding torque at each angle of the encoder 41b changes. Therefore, a coefficient of the approximate equation obtained by the approximate equation calculation unit 76 changes. The determination data 73 includes a coefficient determination value for determining the coefficient of the approximate equation. The origin setting unit 75 compares the coefficient of the approximate equation obtained by the approximate equation calculation unit 76 with the coefficient determination value to make a determination. When the coefficient of the approximate equation changes, the origin setting unit 75 can detect that at least one of the type of the plasticized material 18, the temperature condition of the heater 28 of the plasticizing unit 15, or the flow rate in the plasticizing unit 15 changes.

The detection unit 40 including the origin setting unit 75 and the plunger motor 41 may detect whether at least one of the type of the plasticized material 18, the temperature condition of the heater 28 of the plasticizing unit 15, or the flow rate in the plasticizing unit 15 matches a preset condition.

According to this configuration, the approximate equation calculation unit 76 accurately obtains a relationship between a position of the plunger 37 and a torque value of a holding torque. When at least one of the type of the plasticized material 18, the temperature condition of the heater 28 of the plasticizing unit 15, or the flow rate in the plasticizing unit 15 does not match the predetermined condition, the relationship between the position of the plunger 37 and the torque value of the holding torque falls out of a predetermined range. Therefore, it is possible to detect that at least one of the type of the plasticized material 18, the temperature condition of the heater 28 of the plasticizing unit 15, or the flow rate in the plasticizing unit 15 does not match the preset condition. It is possible to prevent the plasticized material 18 from being fed out from the nozzle opening 16*a* under a condition that the above-described relationship falls out of the predetermined range.

A detection of an angle of the encoder 41*b* at the reference point 92 by the origin setting unit 75 is a detection of a position of the plunger 37. The reference point 92 calculated by detecting a position of the plunger 37 is a detection value. The position of the plunger 37 is detected at any time after the three-dimensional shaping device 1 starts to operate.

After the three-dimensional shaping device 1 starts to operate, the origin setting unit 75 stores an angle of the encoder 41*b* indicated by the reference point 92 and an angle of the encoder 41*b* at the origin in the memory 56 as one piece of the plunger data 67. Therefore, data indicating a history of angles of the encoder 41*b* at the reference point 92 and the origin is stored in the memory 56.

When the detection of the position of the plunger 37 is performed for n times, n being a natural number, data of angles of the encoder 41*b* at the reference point 92 and the origin calculated by an n-th detection of a position of the plunger 37 is stored in the memory 56. Next, when an (n+1)-th detection of a position of the plunger 37 is performed, data of angles of the encoder 41*b* at the reference point 92 and the origin calculated by the (n+1)-th detection of a position of the plunger 37 is stored in the memory 56.

A reference point difference determination value is included in the determination data 73 stored in the memory 56. The origin setting unit 75 compares a difference between the reference points 92 calculated in the n-th detection and the (n+1)-th detection with the reference point difference determination value. When an absolute value of the difference between the reference points 92 calculated in the n-th detection and the (n+1)-th detection is larger than the reference point difference determination value, the origin setting unit 75 causes the notification device 59 to notify an alert in cooperation with the notification control unit 81.

In this manner, it is preferable that the origin setting unit 75 causes the notification device 59 to notify an alert when detection values of the n-th detection of a position of the plunger 37 and the (n+1)-th detection of a position of the plunger 37 deviate by a predetermined value or more in a state in which not even a part of the plunger 37 is replaced or detached.

According to this configuration, the origin setting unit 75 and the plunger motor 41 detect a position of the plunger 37 in the first cylinder 36. A movement range of the plunger 37 is detected by detecting the position of the plunger 37. When movement ranges of the plunger 37 of the n-th detection and the (n+1)-th detection deviate by a predetermined value or more, an alert is notified. When the material feeding device 14 is in an abnormal state, a detection value deviates by a predetermined value or more. Therefore, an abnormality of the material feeding device 14 can be notified.

In order to plot data of a holding torque shown in FIG. 12, the holding torque of the plunger motor 41 is detected by changing an angle of the encoder 41*b*. The origin setting unit 75 detects the holding torque by setting an angle of the encoder 41*b* in the n-th detection to a predetermined angle. The origin setting unit 75 detects the holding torque by changing an angle of the encoder 41*b* in the (n+1)-th detection by a predetermined angle.

The origin setting unit 75 compares a difference between holding torques calculated in the n-th detection and the (n+1)-th detection with a holding torque difference determination value. When an absolute value of the difference between the holding torques calculated in the n-th detection and the (n+1)-th detection is larger than the holding torque difference determination value, the origin setting unit 75 causes the notification device 59 to notify an alert in cooperation with the notification control unit 81.

A position of the plunger 37 is detected by changing angles of the encoder 41*b* in the n-th detection and the (n+1)-th detection. At this time, it is preferable that the origin setting unit 75 causes the notification device 59 to notify an alert when detection values of the n-th detection of a position of the plunger 37 and the (n+1)-th detection of a position of the plunger 37 deviate by a predetermined value or more in a state in which not even a part of the plunger 37 is replaced or detached.

A movement of the plunger 37 and a detection of a position of the plunger 37 are performed alternately. An alert is notified when detection values of the n-th detection of a position of the plunger 37 and the (n+1)-th detection of a position of the plunger 37 deviate by a predetermined value or more. Therefore, it is possible to notify an abnormality of the three-dimensional shaping device 1 caused by a movement of the plunger 37.

It is preferable that the origin setting unit 75 and the plunger motor 41 detect a position of the plunger 37 in the first cylinder 36 under a condition that a detection value of the pressure sensor 54 of the pressure detection unit 34 is the first determination value or more and the second determination value or less.

According to this configuration, a pressure of the plasticized material 18 in the flow path 31 is adjusted within a range from the first determination value to the second determination value. The first determination value and the second determination value are set in a range in which the origin setting unit 75 and the plunger motor 41 can detect a position of the plunger 37. Therefore, the origin setting unit 75 and the plunger motor 41 can accurately detect a position of the plunger 37.

The three-dimensional shaping device 1 includes the material feeding device 14 and the stage 3. According to this configuration, the three-dimensional shaping device 1 includes the material feeding device 14. In the material feeding device 14, an origin position of the plunger 37 can be accurately set. Therefore, the three-dimensional shaping device 1 can be implemented as a device including the material feeding device 14 capable of accurately setting an origin position of the plunger 37.

Second Embodiment

The present embodiment is different from the first embodiment in that a sensor that detects a position of the plunger 37 is different. The same components as those of the first embodiment are denoted by the same reference numerals, and redundant description thereof will be omitted.

Figure 13:
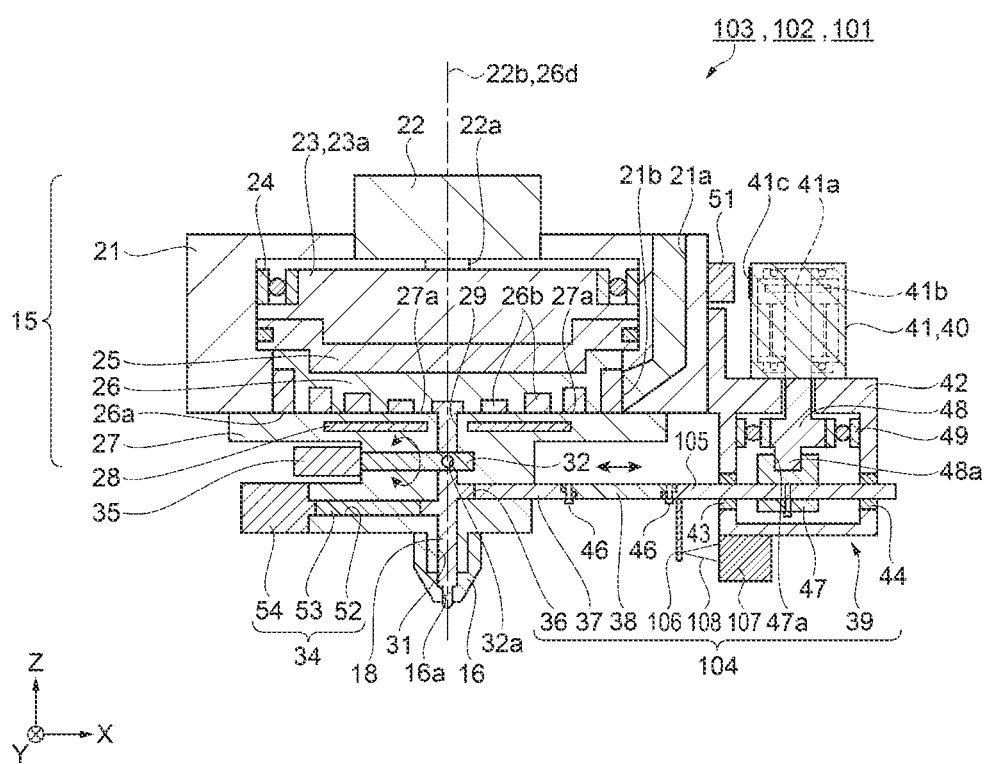
FIG. 13 is a schematic side cross-sectional view showing a configuration of a material feeding device according to a second embodiment.

As shown in FIG. 13, a material feeding device 103 in a shaping unit 102 of a three-dimensional shaping device 101 includes a suction unit 104. In the suction unit 104, a reciprocating rod 105 is provided in a manner of passing through the first bearing 43 and the second bearing 44. The coupling rod 38 couples the plunger 37 and the reciprocating rod 105. The reciprocating rod 105 has a prismatic shape and has a structure that does not rotate.

A reflection plate 106 is disposed at the Z negative direction side and the Y negative direction side of the reciprocating rod 105. The reflection plate 106 has a reflection surface at the X positive direction side. A distance sensor 107 serving as a detection unit is provided at the Z negative direction side of the housing 42. The distance sensor 107 detects a distance between the distance sensor 107 and the reflection plate 106.

A type of the distance sensor 107 is not particularly limited. The distance sensor 107 may be a sensor of an optical type, a capacitance type, a magnetic type, or the like. For example, the distance sensor 107 is an optical sensor in the present embodiment. The distance sensor 107 irradiates the reflection plate 106 with light 108. The distance sensor 107 receives the light 108 reflected by the reflection plate 106 and detects a position of the reflection plate 106. The distance sensor 107 measures a distance between the distance sensor 107 and the reflection plate 106 using a triangulation method.

The distance sensor 107 is fixed to the housing 42. The housing 42 is fixed to the screw case 21. The screw case 21 is fixed to the barrel 27. The first cylinder 36 is formed in the barrel 27. A relative position between the distance sensor 107 and the first cylinder 36 is known. The reflection plate 106 is fixed to the reciprocating rod 105. The reflection plate 106 moves in conjunction with the plunger 37. A relative position between the reflection plate 106 and the plunger 37 is also known.

The distance sensor 107 detects a position of the plunger 37 in the first cylinder 36 by measuring a distance between the distance sensor 107 and the reflection plate 106. According to this configuration, the distance sensor 107 can detect a position of the plunger 37. Therefore, the plunger 37 can be operated accurately. An origin position of the plunger 37 can be set accurately.

Third Embodiment

The present embodiment introduces an example of an injection molding device including a material feeding device corresponding to the material feeding device 14 according to the first embodiment.

Figure 14:
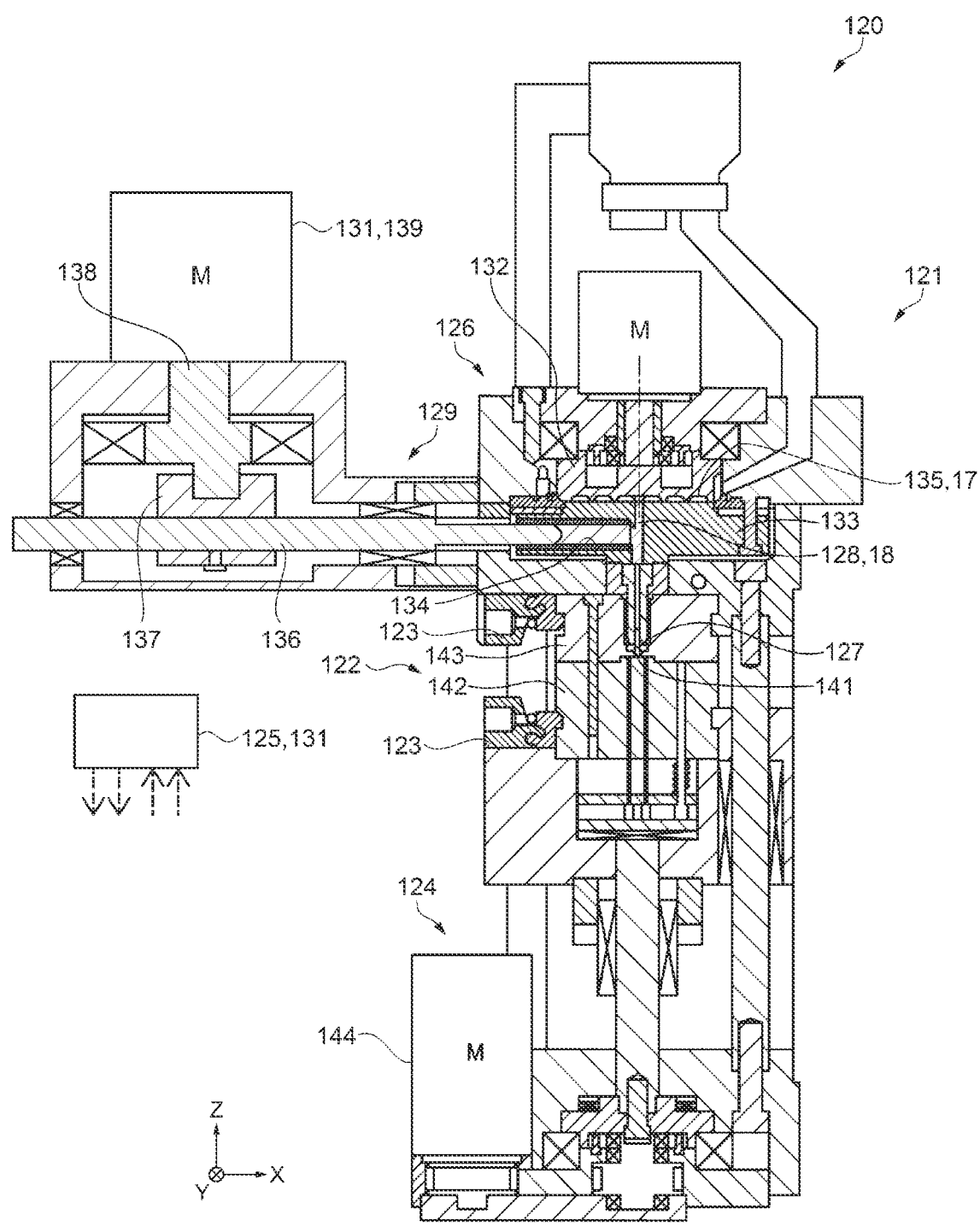
FIG. 14 is a schematic side cross-sectional view showing a configuration of an injection molding device according to a third embodiment.

As shown in FIG. 14, an injection molding device 120 includes a material feeding device 121, a mold 122, a mold support portion 123 serving as a support portion, a mold clamping device 124, and a control unit 125. The material feeding device 121 corresponds to the material feeding device 14 according to the first embodiment.

The material feeding device 121 includes a plasticizing unit 126, a nozzle 127, a flow path 128, a suction unit 129, and a detection unit 131. The plasticizing unit 126, the nozzle 127, the flow path 128, the suction unit 129, and the detection unit 131 respectively correspond to the plasticizing unit 15, the nozzle 16, the flow path 31, the suction unit 33, and the detection unit 40 according to the first embodiment. The plasticizing unit 126 includes a flat screw 132 and a barrel 133. An injection cylinder 134 is coupled to the flow path 128 formed in the barrel 133. The injection cylinder 134 corresponds to the first cylinder 36 according to the first embodiment. Under the control of the control unit 125, the material feeding device 121 plasticizes the resin pellets 17 supplied to a groove 135 of the flat screw 132, generates the plasticized material 18 in a form of a paste having fluidity, and guides the plasticized material 18 from the flow path 128 to the suction unit 129.

The suction unit 129 includes the injection cylinder 134, a plunger 136, a yoke 137, a crank pin 138, and a plunger motor 139 serving as a motor and a detection unit. The plunger 136 corresponds to a combination of the plunger 37, the coupling rod 38, and the reciprocating rod 45 according to the first embodiment. The yoke 137, the crank pin 138, and the plunger motor 139 respectively correspond to the yoke 47, the crank pin 48, and the plunger motor 41 according to the first embodiment.

The suction unit 129 injects the plasticized material 18 in the injection cylinder 134 into a cavity 141. Under the control of the control unit 125, the suction unit 129 controls an injection amount of the plasticized material 18 injected from the nozzle 127. The injection cylinder 134 is a substantially cylindrical member coupled to the flow path 128 of the barrel 133, and includes the plunger 136 in the injection cylinder 134. The plunger 136 slides inside the injection cylinder 134, and pressure-feeds the plasticized material 18 in the injection cylinder 134 to the nozzle 127 coupled to the material feeding device 121. The plunger 136 is driven by the plunger motor 139.

The mold 122 includes a movable mold 142 and a fixed mold 143. The mold 122 is held by the mold support portion 123 in a replaceable manner. The movable mold 142 and the fixed mold 143 are provided in a manner of facing each other, and the cavity 141 which is a space corresponding to a shape of a molded object is formed between the movable mold 142 and the fixed mold 143. The plasticized material 18 pressure-fed by the suction unit 129 is injected into the cavity 141 through the nozzle 127.

The mold clamping device 124 includes a mold drive unit 144. The mold drive unit 144 opens and closes the movable mold 142 and the fixed mold 143. Under the control of the control unit 125, the mold clamping device 124 drives the mold drive unit 144 to move the movable mold 142 and open and close the movable mold 142 and the fixed mold 143.

The injection molding device 120 includes the material feeding device 121 and the mold support portion 123 that detachably supports the mold 122. The material feeding device 121 corresponds to the material feeding device 14 according to the first embodiment. The plasticized material 18 is injected from the nozzle 127 of the material feeding device 121 toward the mold 122.

According to this configuration, the injection molding device 120 includes the material feeding device 121 corresponding to the material feeding device 14 described in the first embodiment. The material feeding device 121 can accurately set an origin position of the plunger 136. Therefore, the injection molding device 120 can be implemented as a device including the material feeding device 121 capable of accurately setting the origin position of the plunger 136. As a result, the injection molding device 120 can inject the plasticized material 18 measured with high accuracy into the mold 122.

The injection molding device 120 may include the material feeding device 121 corresponding to the material feeding device 103 described in the second embodiment. In this case, the injection molding device 120 can also be implemented as a device including the material feeding device 121 capable of accurately setting the origin position of the plunger 136. As a result, the injection molding device 120 can accurately measure and inject the plasticized material 18 into the mold 122.

What is claimed is:

1. A three-dimensional shaping device comprising:
a plasticizing structure having a flat screw, a barrel, and a first motor, a source material being supplied between the flat screw and the barrel, the source material being plasticized by rotating the flat screw with respect to the barrel by the first motor around a rotating axis to form a plasticized material;
a flow path having first and second ends opposite to each other, the first end being in an inside of the barrel and receiving the plasticized material, the flow path extending along the rotating axis;
a nozzle provided at the second end of the flow path and receiving the plasticized material, the plasticized material being provided toward a stage via a nozzle opening;
a suction structure having:
  a first cylinder extending along a first axis perpendicular to the rotating axis, one end of the first cylinder fluidly communicating with the flow path;
  a plunger extending along the first axis and provided in an inside of the first cylinder; and
  a second motor configured to reciprocally drive the plunger along the first axis to suck the plasticized material from the flow path and push the plasticized material to the flow path;
a pressure detector configured to detect a pressure value of the plasticized material in the flow path, the pressure detector including:
  a second cylinder extending along a second axis perpendicular to the rotating axis, one end of the second cylinder fluidly communicating with the flow path;
  a first rod extending along the second axis and provided in an inside of the second cylinder; and
  a pressure sensor provided at a side of an opposite end of the second cylinder;
a memory configured to store a program; and
a processor configured to execute the program so as to:
  receive the pressure value from the pressure detector;
  detect a position of the plunger under a condition that the pressure value of the pressure detector is a first determination value or more and a second determination value or less;
  control the second motor based on the position of the plunger;
  control the first motor based on the pressure value so that the pressure value is the first determination value or more and the second determination value or less;
  detect the position of the plunger based on an approximation curve, the approximation curve being calculated based on a plurality of torque values of the second motor measured by changing the position of the plunger; and
  form a three-dimensional shaped object on the stage while controlling flow of the plasticized material in the flow path based on the position of the plunger.

2. The three-dimensional shaping device according to claim 1, wherein
an output shaft of the second motor and the plunger are coupled to each other via a Scotch yoke mechanism.

3. The three-dimensional shaping device according to claim 2, wherein
the processor is configured to detect the position of the plunger in the first cylinder based on a torque value of the second motor when the plunger is held at a predetermined position under a condition that a pressure in a predetermined range is applied to the plunger.

4. The three-dimensional shaping device according to claim 1, wherein
the three-dimensional shaped object is shaped using the plasticized material discharged from the nozzle, and
the processor is configured to detect the position of the plunger in the first cylinder before shaping of the three-dimensional shaped object is started.

5. The three-dimensional shaping device according to claim 1, wherein
the processor is configured to detect the position of the plunger in the first cylinder after at least a part of the suction structure is replaced.

6. The three-dimensional shaping device according to claim 1, wherein
the processor is configured to detect the position of the plunger in the first cylinder after at least a part of the suction structure is detached.

7. The three-dimensional shaping device according to claim 1, wherein
the processor is further configured to detect whether at least one of a type of the plasticized material, a temperature condition of a heater of the plasticizing structure, or a flow rate in the plasticizing structure matches a preset condition.

8. The three-dimensional shaping device according to claim 1, wherein
the processor is further configured to cause a notification device to notify an alert when detection values of an n-th detection of the position of the plunger and an (n+1)-th detection of the position of the plunger deviate by a predetermined value or more in a state in which not even a part of the plunger is replaced or detached.

9. An injection molding device comprising:
a plasticizing structure having a flat screw, a barrel, and a first motor, a source material being supplied between the flat screw and the barrel, the source material being plasticized by rotating the flat screw with respect to the barrel by the first motor around a rotating axis to form a plasticized material;
a flow path having first and second ends opposite to each other, the first end being in an inside of the barrel and receiving the plasticized material, the flow path extending along the rotating axis;
a nozzle provided at the second end of the flow path and receiving the plasticized material, the plasticized material being provided toward a mold via a nozzle opening;
a mold support configured to detachably support the mold;
a suction structure having:
  a first cylinder extending along a first axis perpendicular to the rotating axis, one end of the first cylinder fluidly communicating with the flow path;
  a plunger extending along the first axis and provided in an inside of the first cylinder; and
  a second motor configured to reciprocally drive the plunger along the first axis to suck the plasticized material from the flow path and push the plasticized material to the flow path;
a pressure detector configured to detect a pressure value of the plasticized material in the flow path, the pressure detector including:
  a second cylinder extending along a second axis perpendicular to the rotating axis, one end of the second cylinder fluidly communicating with the flow path;

a first rod extending along the second axis and provided in an inside of the second cylinder; and a pressure sensor provided at a side of an opposite end of the second cylinder;

a memory configured to store a program; and a processor configured to execute the program so as to:

receive the pressure value from the pressure detector;

detect a position of the plunger under a condition that the pressure value of the pressure detector is a first determination value or more and a second determination value or less;

control the second motor based on the position of the plunger;

control the first motor based on the pressure value so that the pressure value is the first determination value or more and the second determination value or less;

detect the position of the plunger based on an approximation curve, the approximation curve being calculated based on a plurality of torque values of the second motor measured by changing the position of the plunger; and form a molded object in the mold while controlling flow of the plasticized material in the flow path based on the position of the plunger.

10. The three-dimensional shaping device according to claim 2, wherein the Scotch yoke mechanism includes a pin that rotates in conjunction with the output shaft of the second motor, and a yoke that has a groove into which a tip of the pin is inserted, and the suction structure further includes:

a second rod fixed to the yoke and extending along the second axis, and a third rod disposed between the first rod and the second rod and extending along the second axis, wherein the third rod is detachably fixed to the first rod, and the third rod is detachably fixed to the second rod.

11. The three-dimensional shaping device according to claim 1, wherein the processor is further configured to:

monitor whether at least a part of the suction structure is replaced or detached; and detect the position of the plunger after the suction structure is replaced.

12. The three-dimensional shaping device according to claim 1, wherein the first cylinder extends from a first point of the flow path toward a first direction along the first axis, the second cylinder extends from a second point of the flow path toward a second direction along the second axis, and the second point is located closer to the nozzle opening than the first point along the rotating axis.

* * * * *